July 5, 1938.   O. K. KJOLSETH   2,123,053
RAILWAY TRUCK
Filed Jan. 27, 1937
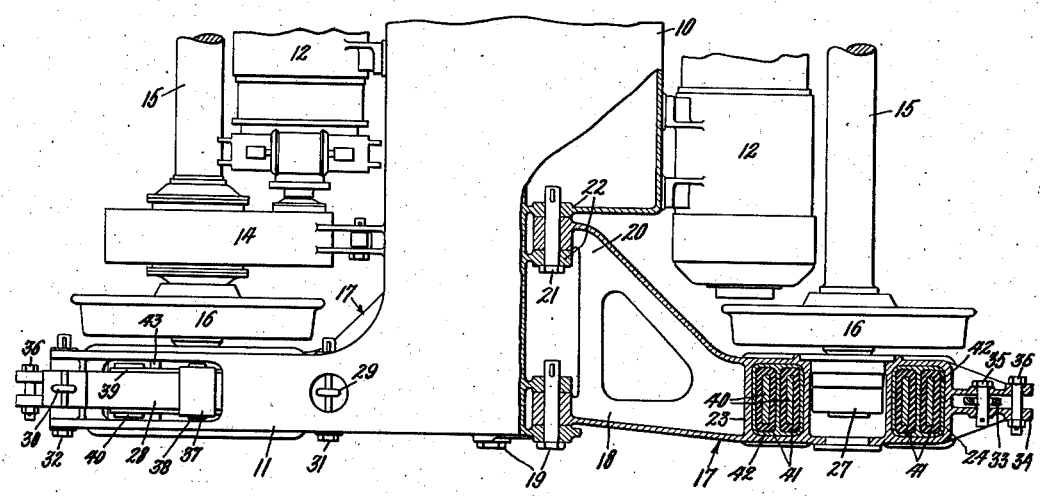
Inventor:
Ole K. Kjolseth,
by Harry E. Dunham
His Attorney.

Patented July 5, 1938

2,123,053

UNITED STATES PATENT OFFICE 2,123,053

RAILWAY TRUCK

Ole K. Kjolseth, Erie, Pa., assignor to General Electric Company, a corporation of New York Application January 27, 1937, Serial No. 122,591

6 Claims. (Cl. 105—182)

My invention relates to trucks for locomotives or cars.

An object of my invention is to provide an improved and simplified truck construction.

Another object of my invention is to provide an improved and quiet operating journal box for such an improved truck, wherein shocks and jars received by the wheels are effectively dampened by the truck suspension system.

Further objects and advantages of my invention will become apparent from the following description referring to the accompanying drawing, and the features of novelty which characterize my invention will be pointed out with particularity in the claims annexed to and forming part of this specification.

For a better understanding of my invention, reference is made to the accompanying drawing wherein Fig. 1 is a fragmentary plan view, partly in section, of a railway truck embodying my invention, and Fig. 2 is a side elevation, partly in section, of the truck shown in Fig. 1.

Referring to the drawing, I have shown a railway vehicle truck provided with a unitary truck frame having a bolster 10 extending between and integrally connecting the central portions of side frames 11. The truck is provided with driving motors 12 supported by brackets 13 on the bolster 10 and connected by gears arranged in housings 14 to axles 15 and wheels 16. In order to provide more quiet operating journal boxes, and to eliminate the wear between the journal boxes and the usual sliding pedestals, I provide mounting frames 17 arranged at each corner of the truck, and each having an arm 18 which is pivotally connected by a pivot pin 19 to the side frame 11 and an arm 20 pivotally connected by a pivot pin 21 to brackets 22 formed on the bolster 10. In this manner, the mounting frames 17 are free to pivot about an axis which is substantially along the transverse center line of the truck. Each of the mounting frames is provided with vertically extending casings 23 and 24 arranged on opposite sides of each of the truck axles 15. The lower ends of the casings are connected together by integral tie bars 25 and the upper ends thereof are connected together by arcuate bearing members 26 supported by journal bearings 27 on the axles 15. The truck frame is resiliently supported by the mounting frames on the axles 15 through longitudinally extending semi-elliptic leaf springs 28. The inner and outer ends of each of the longitudinally extending springs 28 are pivotally secured by spring hangers 29 and 30 through pivot pins 31 and 32, respectively, to the truck side frames 11, and the lower ends of the spring hangers 30 are each provided with a link 33 extending between longitudinally extending projections 34 formed on the outer ends of the mounting frames. A pin 35 extends between the projections 34 at each end of the mounting frame through each of the links 33 and thereby insures against excessive vertical displacement of the side frame 11 with respect to the mounting frames 17. The projections 34 and bolts 36 secure attachment of safety chains to cab underframe. The leaf springs 28 are each secured in assembled relation by a spring strap 37, which pivotally engages a pivotal bearing seat 38 supported on a spring seat 39. Each of the spring seats is secured at each end to a pair of U-shaped supporting members 40. These supporting members extend within the casings 23 and 24, and are supported therein by cushions 41 of resilient rubbery material, such as rubber vulcanized to the supporting members 40 and casings 42. A flange 43 is arranged about the upper edge of each of the casings 42 and is supported by the upper end of the mounting frame casings 23 and 24. In this manner shocks and jars received by the wheels 16 are effectively damped out by the resilient rubber cushions 41, and the pivotal connections of the mounting frames to the truck frame and of the longitudinally extending springs 28 to the spring seats 39 and to the side frames 11 provide a support for the truck which permits independent relative vertical movement of each wheel with respect to the truck frame without requiring the conventional sliding side frame pedestals and journal boxes, and thereby eliminates this source of wear and noise and provides an easy riding, quiet operating journal box and truck construction.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A truck for locomotives or cars having a frame, an axle, a mounting frame pivotally connected to said truck frame and supported on said axle, a spring secured to said truck frame, a resilient rubbery member arranged on each side of said axle and connected to said mounting frame, and means including a spring seat supported by said resilient rubbery members and arranged to pivotally support said spring for supporting said truck frame on said mounting frame.

2. A truck for locomotives or cars having side frames, a transom connecting said side frames, an axle, a mounting frame pivotally connected to said side frames and to said transom and supported on said axle, a spring, means for pivotally supporting said spring, means including a resilient rubbery member connected to said mounting frame and to said pivotal supporting means for resiliently supporting said spring on said mounting frame, and means pivotally securing said spring to said side frames for resiliently supporting said truck frame on said mounting frame.

3. A truck for locomotives or cars having a frame, an axle, a mounting frame pivotally connected to said truck frame and mounted on said axle, a longitudinally extending spring, means for connecting said spring to said truck frame, a casing arranged on each side of said axle and secured to said mounting frame, a supporting member extending within each of said casings and arranged to support said spring, and a member of resilient material secured to each of said casings and to said supporting members arranged to resiliently secure together said casings and said supporting members.

4. A truck for locomotives or cars having a frame, an axle, a mounting frame pivotally connected to said truck frame and mounted on said axle, a longitudinally extending spring, hangers pivotally connecting each end of said spring to said truck frame, a spring seat arranged to support said spring, a casing arranged on each side of said axle and secured to said mounting frame, a U-shaped supporting member extending within each of said casings and arranged to support said spring seat, and a resilient rubbery member vulcanized to each of said casings and each of said supporting members arranged to resiliently secure together said casings and said supporting members.

5. A truck for locomotives or cars having a frame, an axle, a spring secured to said frame, a resilient rubbery member arranged on each side of said axle and supported thereon, means for connecting said resilient rubbery members to said frame, and means including a spring seat supported by said resilient rubbery members and arranged to pivotally support said spring for supporting said truck frame on said axle.

6. A truck for locomotives or cars having side frames and a transom extending therebetween, an axle, a resilient rubbery member arranged on each side of said axle and supported thereon, a spring, a supporting element secured within each of said rubbery members, a spring seat mounted on said supporting elements and arranged to pivotally support said spring, means for connecting said resilient rubbery members to said side frames, and means pivotally securing said spring to said side frames for supporting said truck frame on said axle.

OLE K. KJOLSETH.